March 31, 1970  J. F. GURLEY  3,503,420
DIVERTER VALVE
Filed March 20, 1968

INVENTOR
JESSE FRED GURLEY

BY *Clell W. Zickefoose*

ATTORNEY

# United States Patent Office 3,503,420
Patented Mar. 31, 1970

3,503,420
DIVERTER VALVE
Jesse Fred Gurley, Pittsburgh, Pa., assignor to Mobay Chemical Company, Pittsburgh, Pa., a corporation of Delaware
Filed Mar. 20, 1968, Ser. No. 714,705
Int. Cl. F16k 11/08, 19/00; F17d 1/16
U.S. Cl. 137—609                                4 Claims

ABSTRACT OF THE DISCLOSURE

A diverter valve supply system utilizing two two-way valves adapted to have their valve stems simultaneously rotate to block and unblock the flow through each of said valves.

---

Figure 1:
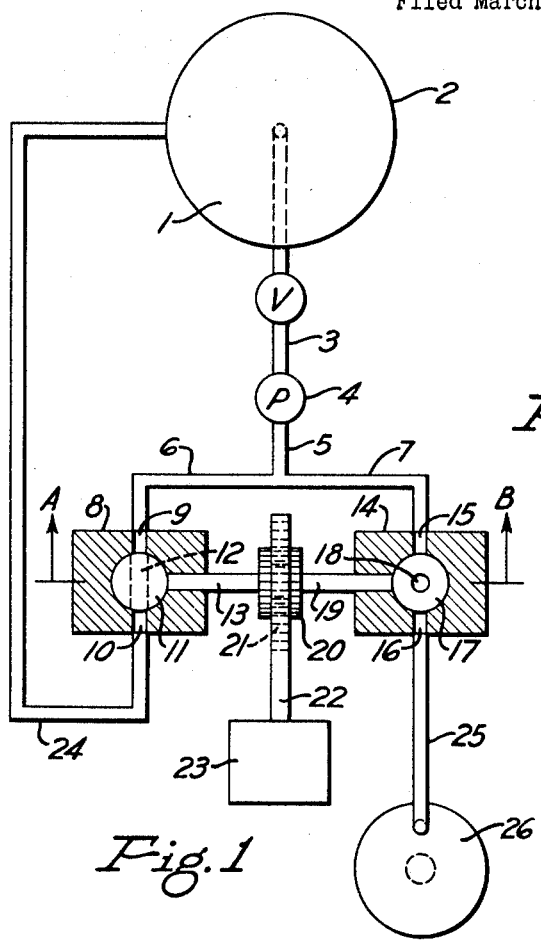

This invention relates to a supply system utilized in the preparation of synthetic resin and the like prepared by reacting together two or more highly reactive components. More particularly, this invention relates to a supply system for making porous and homogeneous polyurethane plastics and to an apparatus for carrying out this process.

In the manufacture of polyurethane plastics from organic compounds having at least two reactive hydrogen atoms and polyisocyanates it is necessary to intimately admix the isocyanate and a catalyst with the organic compound having the reactive hydrogen atoms before any substantial reaction has occurred. If a substantially uniform mixture of the more viscous material with the other component is not obtained almost instantaneously, the resulting product will lack the required degree of uniformity. Proper timing in the mixing of the components of the polyurethane plastic has presented a long standing problem and many attempts have been made to provide a suitable supply and mixing system. Probably the most successful heretofore available mixing apparatus is the type disclosed in U.S. Patent 2,764,565 granted to Hoppe et al. This type of apparatus provides for the injection of the less viscous material into the more viscous organic compound having the reactive hydrogen atoms and under most circumstances sufficient mixing is achieved.

Although as indicated hereinabove the Hoppe et al. process and apparatus usually provides suitable mixing for making polyurethane plastics, it has been found that in certain instances a more uniform and faster mixing would be advantageous. The supplying of polyurethane forming components to such a mixing apparatus must be effected in a precise, accurate and smooth manner such that the mixing of the polyurethane forming components occurs at the proper ratio, at the proper temperature and at the proper pressure balance for the system. The simultaneous entry of all the components into a polyurethane machine mixing head is essential to reduce waste attending start-ups and stops of the mixing head. Also, recirculation of the reactive components prior to their diversion to the mixing head is necessary to permit the balancing of the temperatures and pressures of the various reactive components in order to achieve the metering accuracy required by the present day polyurethane formulation technology.

When a "low pressure" mixing head is utilized, the hereinabove mentioned objectives are accomplished by the proper positioning of low pressure three-way ball or plug valves which permit the components to be either supplied to the mixing head at the proper temperature, pressure and rate or to be recirculated back to the supply chamber of the components. In this manner the production of offgrade or waste polyurethanes is substantially reduced or completely avoided.

However, when a more simultaneous mixing of the components is desired and a "high pressure" mixing head is being utilized, the hereinabove mentioned objectives cannot be accomplished by merely positioning high pressure three-way ball or plug valves in the supply lines of the polyurethane forming components. Such valves are not satisfactory in "high pressure" mixing heads, for example, those operating at about 3,000 to about 5,000 p.s.i., for numerous reasons such as, for example, the valves have very limited service life due to the pressure build-ups accompanying the constant cycle of either diverting the reactive components to the mixing head supply or recirculating the reactive components back to the storage chamber. Also, the use of such three-way valves results in pressure surges due to the "blind port" resulting when switching from one port to the other in a three-way valve. As a result, there is produced a substantial amount of offgrade polyurethane and also there is present the dangers concomitant with the pressure buildup resulting from the blocked or partially blocked port such as pump damage and seal deformation due to hydraulic hammer.

Figure 2:
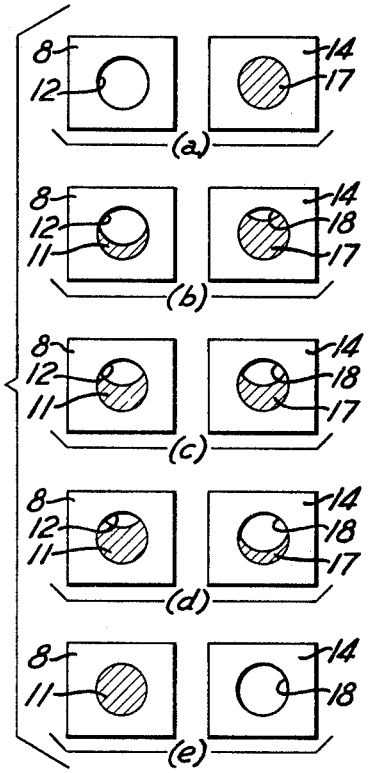
Figure 3:
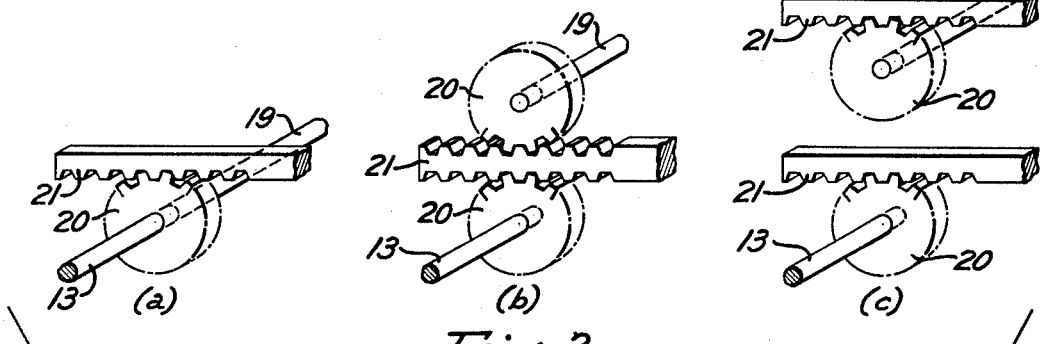

It is, therefore, an object of the present invention to provide an improved process and apparatus for the supplying of the reactive components of a synthetic resin, particularly the reactive components of a polyurethane forming reaction mixture, to a suitable mixing apparatus. Another object of this invention is to provide a process and apparatus for the production of a more homogeneous polyurethane reaction mixture with a reduction in the production of offgrade and waste polyurethane. Another object of this invention is to provide a process and apparatus for producing polyurethanes of improved uniformity. A further object is to provide an improved process and apparatus for supplying polyurethane forming components to a mixing head. Still futher objects will become apparent from the following discussion with reference to the accompanying drawings in which FIGURE 1 is a schematic drawing illustrating the supply system and apparatus of the invention, FIGURE 2 is a sectional view taken along line A–B of FIGURE 1 showing the port opening of the valves at various stages of rotation of the valve plugs and FIGURE 3 is a schematic drawing of various types of rotating means employed in the apparatus of this invention.

In accordance with this invention, generally speaking, the foregoing objects and others are accomplished by providing a process and apparatus for supplying the reactive components of a synthetic resin such as the reactive components of a polyurethane forming reaction mixture, to a mixing chamber wherein the conduit supplying a reactive component has positioned therein a diverter valve system comprising two two-way valves comprising a first two-way valve and a second two-way valve. The first and second two-way valves each have an inlet port and a discharge port. Likewise, each of said two-way valves has interposed between their respective inlet and discharge ports a rotatable plug means containing a flow-through port disposed therein. The flow-through ports are adapted to permit a reactive component to flow through the valves from the inlet port to the outlet port. The rotatable plug means of the first and second valves are adapted to permit flow of a reactive component through the first valve when flow of the reactive component through the second valve is blocked by the rotatable plug means of the second valve. The rotatable plug means of the first and second valves are further adapted to rotate simultaneously to unblock the flow of a reactive component through the second valve while the flow of the reactive component through the first valve is being blocked. One of the valves is mounted such that the discharge port of the valve is connected to a recycle conduit connected back to the supply chamber of the reactive component and the discharge port of the second valve is attached to a supply conduit connected to a second chamber, preferably a mixing head.

Preferably, this invention comprises two two-way valves positioned such that their valve stems are directed towards each other on a common center-line, each of said two valve stems being seated into the hub of a common rotating means. Stated differently, the apparatus of this invention preferably contemplates two two-way valves positioned by suitable supported framework so as to mount the valve stems directed towards each other on a common center-line and substantially directly opposite each other wherein each valve stem is seated into the hub of a common rotating means, which rotating means is connected to a drive means and a power source designed to actuate said rotating means and to thereby effect rotation of the valve stems. In a particular preferred embodiment of the invention, the apparatus utilizes two two-way ball valves having the flow-through ports of their rotatable plug means positioned about 90° out of phase with each other.

Referring now to the drawings, FIGURE 1 shows an apparatus illustrative of the invention comprising a system for supplying a reactive component, such as a reactive component of a polyurethane forming reaction mixture, from a first chamber to a second chamber.

In the following discussion, the apparatus and process of this invention is illustrated in an environment in which a polyurethane-forming reactive component is supplied from a storage chamber to a mixing head merely as a preferred embodiment. It is to be considered, however, that such illustration is merely a preferred embodiment and is not intended to limit the application of the apparatus and process of this invention since the apparatus and process may be employed in other supply systems.

A reactive component 1 of a polyurethane-forming reaction mixture is stored in a suitable storage chamber 2 until ready for use. The reaction forming mixture is withdrawn from the storage chamber 2 through a suitable conduit means 3 and pumped by means of a suitable pump 4, for example, a gear pump, through a second conduit means 5. Said second conduit means branches into two conduit means 6 and 7 by any suitable means such as, for example, a T connection. The two branches 6 and 7 of the conduit means are suitably disclosed to be connected to two two-way valves 8 and 14 by means of inlet ports 9 and 15 respectively. The two two-way valves are equipped with outlet or discharge ports 10 and 16 and rotatable plug means 11 and 17 having flow-through ports 12 and 18 suitably placed therein. The rotatable plugs 11 and 17 are suitably mounted and rotatably adapted to be capable of either receiving the flow of reactive component 1 through ports 12 and 18 thereby permitting flow through discharge ports 10 and 16 or else blocking the flow of reactive component 1 so that it can flow out of inlet ports 9 and 15 and thence out through discharge ports 10 and 16.

The two two-way valves 8 and 14, preferably high pressure ball valves, are positioned by any suitable supporting framework (not shown) so as to mount the valve stems 13 and 19 preferably on a common center-line and preferably directed opposite each other. Each of the valve stems 13 and 19 are seated into the hub of a common rotating means 20, for example, a gear. Engaging said rotating means 20 in a manner adapted to effectuate rotation of said rotating means 20 is a drive means 21, preferably a toothed-rack or gear. Rotating means 20 and drive means 21 are preferably intermeshed gears. Said drive means 21 may be positioned in any manner so as to rotatably engage rotating means 20, that is, it may be mounted above, below or tangentially aside the rotating means 20. The drive means 21 is attachably connected by a power conveying means 22, for example, a pneumatic cylinder, to a suitable power source 23, for example, an air pressure source.

The rotatable plugs 11 and 17 of the two valves 8 and 14 are suitably positioned so that when port 12 of valve plug 11 is positioned to receive all the flow of reactive component 1 from conduit 6 through inlet port 9 and to thereby permit discharge of said reactive component 1 through discharge port 10 and thence to recycle conduit 24 back to storage chamber 2, then port 18 of valve plug 17 is positioned to block the flow of reactive component 1 in conduit 7 and inlet port 15 and to thereby prevent any flow of reacting component 1 through discharge port 16 to a second chamber 26, preferably a mixing head, by way of a conduit means 25. That is, the flow-through port holes 12 and 18 of rotatable plug means 11 and 17 in valves 8 and 14, respectively, are preferably indexed in a position approximately about 90° out of phase with each other. Most preferably, the rotatable plugs 11 and 17 are positioned such that when port 12 of valve plug 11 starts to block inlet port 9 of valve 8, then port 18 of valve plug 17 starts to unblock inlet port 15 of valve 14 such as is shown in FIGURE 2(b). In this way when drive means 21 actuated by power source 23 through power conveying means 22 engages and rotates rotating means 20, said rotating means 20 simultaneously rotates valve stems 13 and 19 so that the rotation of the valve stems causes one valve plug port, for example, port 18, to open and the other valve plug port, for example, port 12, to close in such a manner that there is always present sufficient unblocked port entrance to prevent any pressure buildup while switching flow from one discharge port to the other discharge port. That is, during the interval of turning the valve plugs, one or the other port is open or both ports are partially open as is shown in FIGURES 2(a) through 2(e).

It is to be understood that similar supply systems for each reactive component of the polyurethane forming reaction mixture may be utilized and connected to a common mixing head.

In FIGURE 3 there is illustrated some of the variations possible in mechanisms designed to simultaneously actuate the valve stems of the two two-way valves. The common principle of operation permits the use of any suitable actuating means so long as the two valve stems are simultaneously actuated. For example, as illustrated in FIGURE 3(a), valve stems 13 and 19 may be positioned directly opposite each other on a common center-line and mounted into a rotating gear 20 and said rotating gear 20 is driven by a drive means 21 mounted substantially above rotating gear 20. Alternatively, valve stems 13 and 19 may be mounted on parallel center lines and facing each other as is shown in FIGURE 3(b). In such a case, valve stems 13 and 19 are mounted on two separate rotating gears 20 and 20', said rotating gears being driven by a drive means 21 spaced in intermeshing relationship between the two rotating gears. Also it is possible that the two valve stems may be mounted in any arrangement if each of the valve stems is equipped with its own rotating gear 20 and its own drive means 21 as illustrated in FIGURE 3(c). In such a case, it is only necessary that each of the two separate drive means be actuated simultaneously from either a separate or common power source.

In the operation of the apparatus as illustrated in FIGURE 1, a reactive component 1 is discharged from a storage chamber 2 through a conduit 3 and is supplied under pressure from a pump 4 to a conduit 5 and thence to conduits 6 and 7. Valve 8 has rotatable plug 11 positioned so that port 12 engages inlet port 9 and discharge port 10 in a flow-through (unblocked) arrangement thereby permitting reactive component 1 to flow through valve 8 into recycle conduit 24 whereby the reactive component 1 is recycled back to the storage chamber 2. At this time, rotatable plug 17 of valve 14 is positioned with port 18 in a non-flow-through (blocked) position such that reactive component 1 cannot flow through port 18, discharge port 16, supply conduit 25 and thence to mixing head 26. In this manner the reactive component 1 may be recycled until the desired pressure, temperature and rate of flow are achieved for the entire reaction supply system. When the desired parameters are achieved, then power source 23 actuates drive means 21 through power conveying means 22 and said drive means 21 engages rotating means 20 which in turn simultaneously rotates valve stems 13 and 19 to simultaneously transfer valve plug 11 and thus port 12 to non-flow-through relationship with inlet port 9 and discharge port 10 of valve 8 and valve plug 17 and port 18 to flow through (unblocked) relationship with inlet port 15 and discharge port 16 of valve 14 and thereby effectuate a smooth effective and efficient transfer from recycle of the reactive component 1 through conduit 24 to supply of the reactive component 1 to mixing head 26 through supply conduit 25 without the problems attendant with the use of prior art systems as set forth hereinabove.

If desired, suitably placed micro-switches and signal lamps or some equivalent means may be used to visually indicate the route of flow of the reactive component through the two-valve supply system.

The supply system and apparatus finds important application in the production of all synthetic resins whose reactive component tends to plug up the mixing apparatus under delivery pressure. This is the case in particular, for example, when a reactive component consisting of a polyol is mixed under high pressure, for example, about 300 to about 15,000 p.s.i., preferably about 1200 to about 5500 p.s.i., most preferably about 3000 to about 5000 p.s.i., with a second component consisting of an isocyanate to produce polyurethanes in the form of foams such as by the method described in the aforementioned Hoppe et al. patent.

Although the process and apparatus has been described with patricular application to "high pressure" systems, it is equally adaptable for use in "low pressure" systems, for example, below about 300 p.s.i. where the attending problems are not as great or prevalent. It is to be realized, however, that the process and apparatus finds its greatest usefulness in high pressure systems.

Any suitable two-way valve, particularly ball or plug valves, may be employed in the process and apparatus of the invention hereinabove described. It is only necessary that the valves be of such suitable material of construction so as not to be easily corroded by the components being handled. When employing the process and apparatus of this invention in "high pressure" supply systems, it is of course necessary that a suitable high pressure two-way valve be selected.

Ideally, the diverter valve supply mechanism comprising the two two-way valves, positioned as hereinabove described, should be placed as close as possible to the mixing head in order to reduce the amount of reactive component present in supply conduit 25. It is to be realized, however, that the diverter valve will function in the above-described manner so long as it is placed in the supply system between the reactive component storage chamber and the mixing head.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention.

What is claimed is:

1. A diverter valve comprising in combination two two-way valves comprising a first two-way valve and a second two-way valve, said first and said second two-way valves each having an inlet port and a discharge port, each of said two-way valves having interposed between their respective inlet and discharge ports a rotatable plug means containing a flow-through port disposed therein, said flow-through ports being adapted to permit a reactive component to flow through said valves from said inlet ports to said discharge ports when said rotatable plug means are rotated into fluid-flow relationship with said inlet and said outlet ports, the rotatable plug means of said first valve and said second valve being adapted to permit flow of said reactive component through said first valve when flow of said reactive component through said second valve is blocked by the rotatable plug means of said second valve, said rotatable plug means of said first and said second valves being further adapted to rotate simultaneously to unblock the flow of said reactive component through said second valve while the flow of said reactive component through said first valve is being blocked.

2. The diverter valve of claim 1 wherein said first and said second two-way valves are mounted substantially opposite each other such that the valve stem of said first valve and the valve stem of said second valve are mounted directly toward each other on a common center-line.

3. The diverter valve of claim 2 wherein the valve stem of said first valve and the valve stem of said second valve are mounted to a common hub of a rotating means.

4. The diverter valve of claim 3 wherein said common rotating means is engaged by a drive means attachably connected to a power source through a power conveying means.

References Cited

UNITED STATES PATENTS

| | | | |
|---|---|---|---|
| 827,588 | 7/1906 | Warnock | 137—630.16 |
| 1,688,391 | 10/1928 | Magazzini et al. | 137—630.16 |
| 2,202,249 | 5/1940 | Felger | 137—630.16 |
| 3,190,584 | 6/1965 | Gire et al. | 137—609 X |
| 3,216,450 | 11/1965 | Timmons | 137—630.16 X |
| 3,365,965 | 1/1968 | French | 137—627.5 X |
| 3,372,658 | 3/1968 | Ammann | 137—630.16 X |

LOUIS K. RIMRODT, Primary Examiner

U.S. Cl. X.R.

137—571